June 14, 1938. L. F. EHLERS 2,120,860
EXTRACTING AND FILTERING APPARATUS
Filed June 2, 1937 2 Sheets-Sheet 1
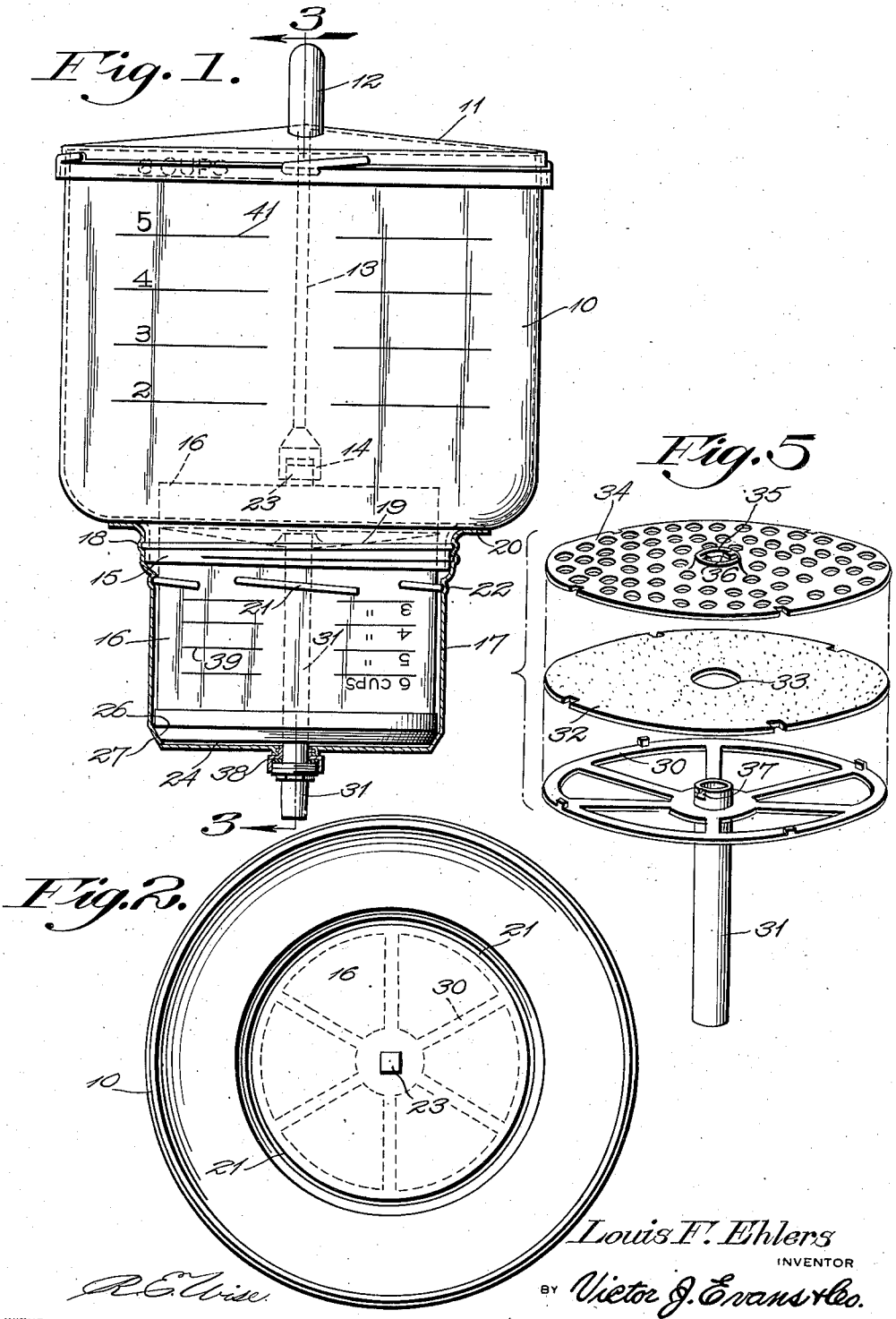
Louis F. Ehlers
INVENTOR
BY Victor J. Evans & Co.
ATTORNEYS June 14, 1938.  L. F. EHLERS  2,120,860
EXTRACTING AND FILTERING APPARATUS
Filed June 2, 1937   2 Sheets-Sheet 2
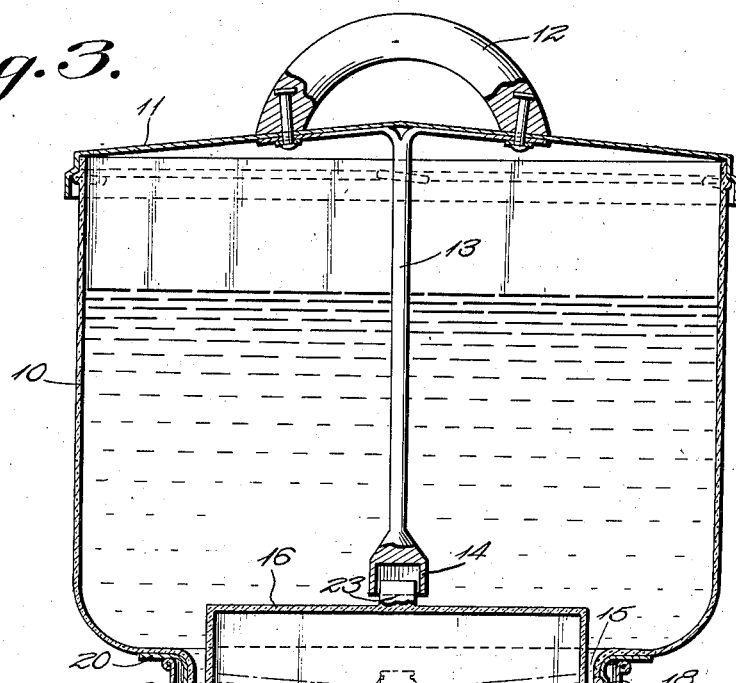
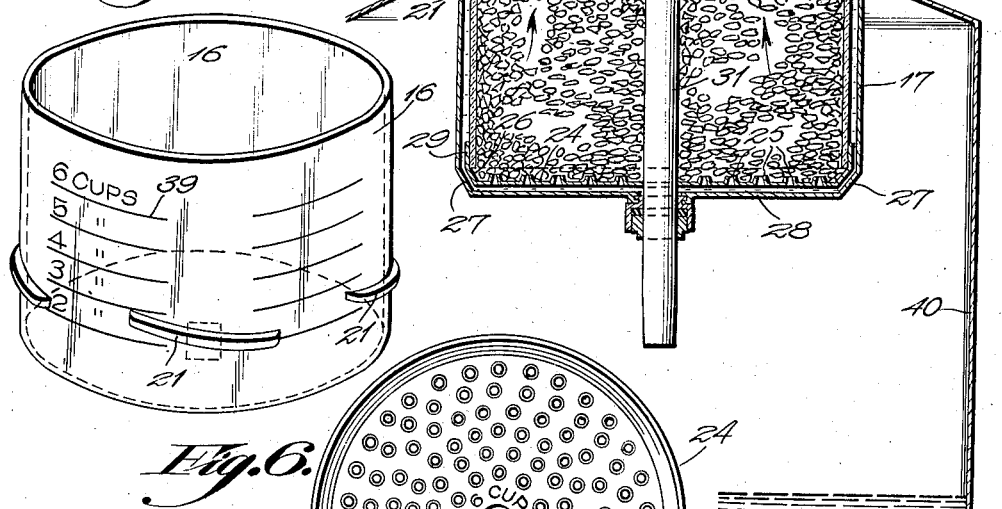
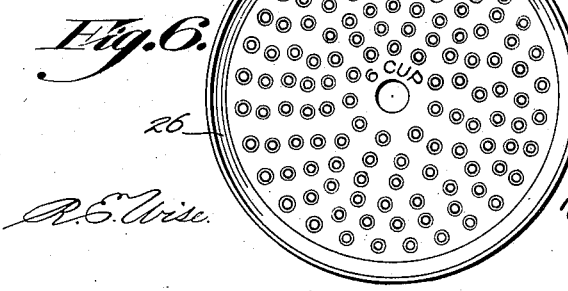
Louis F. Ehlers
INVENTOR
Victor J. Evans & Co.
ATTORNEYS
WITNESS Patented June 14, 1938

2,120,860

UNITED STATES PATENT OFFICE 2,120,860

EXTRACTING AND FILTERING APPARATUS

Louis F. Ehlers, Banning, Calif.

Application June 2, 1937, Serial No. 146,063

3 Claims. (Cl. 53—3)

This invention relates to extracting and filtering apparatus and has for an object to provide a device for rapidly extracting the flavor essence from any ground material, more especially finely ground roasted coffee.

It is well known that finely ground coffee becomes saturated and gravitates rapidly in hot water, and when the water pressure is above the coffee and a filter below the coffee, the fine particles clog the exits of the filter and obstruct the free flow of liquid.

With this disadvantage in mind, in the present invention, the water pressure is below and the filter above the coffee granules so that the free flow of liquid through the filter is greatly promoted.

A further object of the invention is to provide a novel valve for controlling the flow of water through the granules so that a uniform flavor, color and body of the essence may be obtained.

A further object is to provide a device of this character which will be formed of a few strong simple and durable parts, which will be inexpensive to manufacture and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification,

Figure 1 is a side elevation of an extracting and filtering apparatus constructed in accordance with the invention.

Figure 2 is a top plan view of the apparatus with the lid removed.

Figure 3 is a longitudinal sectional view through the apparatus showing the same associated with a container for receiving the flavor essence of the coffee granules.

Figure 4 is a detail perspective view of the container for the ground coffee granules.

Figure 5 is an exploded perspective view of the filter member.

Figure 6 is a top plan view of the valve for controlling the flow of water through the granules in the container.

Referring now to the drawings in which like characters of reference designate similar parts in the various views, 10 designates a reservoir, preferably formed of glass and having an open top which is closed by a lid 11 having a handle 12 by means of which the lid may be removed to fill the reservoir with boiling water. The lid is provided with a depending socket wrench 13 having the socket head 14 disposed near the bottom of the reservoir. The bottom of the reservoir is provided with an exteriorly threaded neck 15 which loosely receives a container 16, as best shown in Figure 3.

The container 16 is preferably formed of glass and is loosely receivable in a cup 17 which preferably is formed of metal flared near the top and provided with threads 18 to receive the threads 19 of the reservoir neck 15. The cup is provided at the top with an out-turned flange 20 which bears against the bottom of the reservoir.

The container 16 is preferably in the form of a cup and is received within and is reversed with respect to the cup 17. The container is provided with an interrupted screw thread 21 which permits the boiling water from the reservoir to escape downward between the container and the cup 17 to enter the valve controlled open bottom of the container. The thread is received in the mating thread 22 formed in the wall of the cup 17 to hold the cup and the container assembled. The container is provided on the top with a lug 23 having wrench faces receivable in the socket head 14 of the wrench 13 so that when the handle 12 is rotated the container will be rotated and close or open the valve 24 for controlling the flow of boiling water upward off the granules.

The valve 24 is preferably a disc having perforations 25 therein, the disc being provided with a frusto-conical flange 26 at the edge which coacts with a frusto-conical wall 27 on the bottom 28 of the container 16 in forming a passage for water from below the valve and up through the perforations 25. The valve is provided with a cylindrical flange 29 which is tightly engaged upon the open bottom of the container 16.

A plurality of the valves are used in practice, each having a predetermined number of perforations 25 to control the speed of admission of water to the container 16 to suit various grades of coffee, for example, so that predetermined strength, color and body will be obtained in the beverage.

The filter member is best shown in Figure 5 to comprise a skeleton disc 30 which is mounted on the upper end of a tube 31 and is adapted to support a disc of filter medium 32 the same having a central opening 33 to receive the upper end of the tube. A perforated metal disc 34 is superposed upon the filter medium and is provided with a central hub 35 adapted to telescopically receive the upper end of the tube 31 and be removably secured thereto by lugs 36 which are engaged in bayonet slots 37 in the upper end of the tube.

The tube 31 is of sufficient length to extend considerably below the bottom of the container 16 and cup 17 and the latter is provided with an outlet in the form of a gland nut 38 to receive the tube.

In operation, the filter element shown in Figure 5 is inserted in the container 16 with the perforated disc 34 resting upon the bottom of the container shown in Figure 4. The coffee granules may now be placed in the container on top of the strainer until the mass reaches a predetermined graduation mark 39 denoting cups, for example, six cups. The valve 24 may now be slipped down on the tube and applied to the container and thereafter the container may be reversed and screwed into the cup 17 in which position of the parts the filter paper disc 32 is on top of the coffee granules while the water controlling valve 24 is on the bottom, as best shown in Figure 3.

The cup 17 with the container assembled therewith, may now be applied to the neck of the reservoir 10 to depend from the reservoir. Thereupon the assembled reservoir, cup and container may be inserted in the neck of a vessel 40 with the flange 29 of the cup bearing upon the bead of the vessel neck, as shown in Figure 3. Boiling water may now be poured into the reservoir until it reaches a level even with a predetermined designation mark 41, denoting cups, for example, six cups. The valve 24 is now opened by turning the handle 12 to unscrew the container 16 slightly upward in the cup 17 so that a water passage will exist between the frusto-conical flange 26 of the valve and the frusto-conical wall 27 of the bottom of the cup. The boiling water can now gravitate in the space between the cup and the container and pass beneath the valve and up through the perforations 25 therein. The boiling water rising through the coffee granules, under pressure of the column of water in the reservoir, removes the flavor essence from the granules and flows freely through the filter element to the top of the tube 31. The essence gravitates through the tube 31 and accumulates in the vessel 40.

From the above description it is thought that the construction and operation of the invention will be fully understood without further explanation.

What is claimed is:

1. Apparatus of the class described comprising a reservoir adapted to contain a measured quantity of boiling water, an open bottom container adapted to contain a measured quantity of material for making an infusion, a filter disposed in the container above the material level, a cup depending from the reservoir and housing the container, an interrupted screw threaded connection between the cup and the container forming means for moving the container relatively to the cup, a perforated valve carried by the container and seated on the cup, means for screwing the container into and out of the cup for regulating the position of the valve, said cup being spaced from the container to permit down flow of water from the reservoir between the container and the cup and up flow of water through the cup and through the filter, and an outlet tube for the infusion opening through the filter and projecting exteriorly of the cup.

2. Apparatus of the class described comprising a reservoir having an open top and open bottom and adapted to contain a measured quantity of boiling water, a cup carried by the reservoir and forming a bottom for the reservoir, an open bottom container having imperforate top and side walls nested in the cup and spaced from the cup to permit down flow of water from the reservoir between the cup and the container and up flow of water through the container, said container being adapted to contain material for making an infusion, a filter disposed in the container above the material level, an outlet for the infusion opening through the filter and projecting exteriorly of the container and cup, a perforated valve forming a bottom for the container, a screw thread connection between the cup and the container for regulating the position of the valve, a lug on the top the container having wrench faces, a revoluble lid closing the top of the reservoir, and a socket wrench carried by the lid and engaging said wrench faces for rotating the container when the lid is rotated to screw and unscrew said container relatively to the cup for controlling said valve.

3. Apparatus of the class described comprising a reservoir adapted to contain a measured quantity of boiling water, an open bottom container adapted to contain a measured quantity of material for making an infusion, a filter disposed in the container above the material level, a cup depending from the reservoir and housing the container, a tubular outlet in the container terminating above the filter and projecting exteriorly of the cup, means for supporting the reservoir upon a vessel in which the infusion is to be collected from said outlet, there being a space between the cup and the container permitting down flow of boiling water and upflow of the water through the material and filter to said outlet, and valve means controlling the flow of water into the container.

LOUIS F. EHLERS.